(12) United States Patent
Scheuerman et al.

(10) Patent No.: US 8,700,205 B2
(45) Date of Patent: Apr. 15, 2014

(54) MOVING STOP STATION FOR ROBOTIC ASSEMBLY

(75) Inventors: Robert J. Scheuerman, Washington, MI (US); Rick F. Rourke, Metamora, MI (US); Jianying Shi, Oakland Township, MI (US); Peter W. Tavora, Sterling Heights, MI (US); David Groll, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 413 days.

(21) Appl. No.: 13/198,781

(22) Filed: Aug. 5, 2011

(65) Prior Publication Data

US 2013/0035783 A1   Feb. 7, 2013

(51) Int. Cl.
*G06F 7/00* (2006.01)
(52) U.S. Cl.
USPC .......................................................... 700/218
(58) Field of Classification Search
USPC .......................................................... 700/218
See application file for complete search history.

(56) References Cited

U.S. PATENT DOCUMENTS

| 4,827,395 A * | 5/1989 | Anders et al. ............. 700/9 |
| 2002/0087217 A1* | 7/2002 | Hernden et al. ............. 700/14 |
| 2010/0076591 A1* | 3/2010 | Lert, Jr. ............. 700/216 |

* cited by examiner

*Primary Examiner* — Ramya Burgess
(74) *Attorney, Agent, or Firm* — Quinn Law Group, PLLC

(57) ABSTRACT

A moving stop station includes a vehicle carrier configured to move a vehicle along an assembly line, an assembly platform disposed adjacent to the assembly line, and a synchronizer in communication with the vehicle carrier and the assembly platform. The synchronizer is configured to synchronize the motion of the assembly platform with the motion of the vehicle carrier as the vehicle carrier moves along a length of the assembly line, and includes a sensor, processor, and actuator. The sensor is configured to sense the position of the vehicle carrier and to generate a position signal corresponding to the sensed position. The processor is configured to receive the position signal and selectively provide a synchronization signal in response, and the actuator is configured to receive the synchronization signal and synchronize the motion of the vehicle carrier and the motion of the assembly platform in response.

18 Claims, 5 Drawing Sheets

MOVING STOP STATION FOR ROBOTIC ASSEMBLY

TECHNICAL FIELD

The present invention relates generally to synchronizing a robotic assembly station with a moving assembly line.

BACKGROUND

In automotive assembly, vehicle bodies are typically carried along a moving assembly line and travel through many (sometimes hundreds) of workstations where various parts are assembled together and/or onto the vehicle body. In robotic assembly stations, or human stations where fine dexterity is required, the vehicle body will typically be moved into the station, where it will then be halted and fixtured in place before any assembly may begin (i.e., a "stop" station). Within the stop station, robotic assembly may be used to, for example, fasten nuts onto bolts, marry a chassis with a frame, position and secure wheels onto rotor hubs, etc.

Stop stations require significant floor space to implement, due to deceleration/acceleration areas needed before/after the station. Additionally, large drive equipment is often required to accelerate and/or decelerate the heavy vehicle body.

SUMMARY

A moving stop station includes a vehicle carrier configured to move a vehicle along an assembly line, an assembly platform disposed adjacent to the assembly line, and a synchronizer in communication with the vehicle carrier and the assembly platform. The synchronizer is configured to synchronize the motion of the assembly platform with the motion of the vehicle carrier as the vehicle carrier moves along a length of the assembly line, and includes a sensor, processor, and actuator. The sensor is configured to sense the position of the vehicle carrier and to generate a position signal corresponding to the sensed position. The processor is configured to receive the position signal and selectively provide a synchronization signal in response, and the actuator is configured to receive the synchronization signal and synchronize the motion of the vehicle carrier and the motion of the assembly platform in response. The synchronization may then result in substantially no relative motion between the vehicle carrier and the assembly platform.

In one embodiment, the synchronizer may include a mechanical stabilizer coupled with the actuator, wherein the actuator is configured to extend the mechanical stabilizer between the vehicle carrier and the assembly platform in response to the synchronization signal. As such, the assembly platform may include a drive mechanism and a clutch configured to selectively disengage the drive mechanism, wherein the drive mechanism is configured to translate the assembly platform along the assembly line. The clutch may then be configured to disengage the drive mechanism in response to the extension of the mechanical stabilizer from the vehicle carrier to the assembly platform. Alternatively, the vehicle carrier may be selectively engagable with a drive line of the assembly line, and the vehicle carrier may be configured to disengage from the drive line in response to the extension of the mechanical stabilizer from the assembly platform to the vehicle carrier.

In an embodiment, the actuator may include a drive mechanism coupled to the assembly platform, wherein the drive mechanism may be configured to translate the assembly platform along the assembly line. As such, the sensor may be a proximity sensor or include a target tracking camera and a target. In either instance, the position signal is indicative of the position of the vehicle carrier along the assembly line relative to the position of the assembly platform along the assembly line.

The moving stop station may include a first length, a second length, and a third length respectively ordered along the assembly line, wherein the synchronizer may be configured to synchronize the motion of the assembly platform with the motion of the vehicle carrier as the vehicle carrier passes through the first length and the third length, though the motion of the assembly platform may not be synchronized with the motion of the vehicle carrier as the vehicle carrier passes through the second length.

In an embodiment, the assembly platform may include one or more precision robotic assembly device.

The above features and advantages and other features and advantages of the present invention are readily apparent from the following detailed description of the best modes for carrying out the invention when taken in connection with the accompanying drawings.

DETAILED DESCRIPTION

Figure 1:
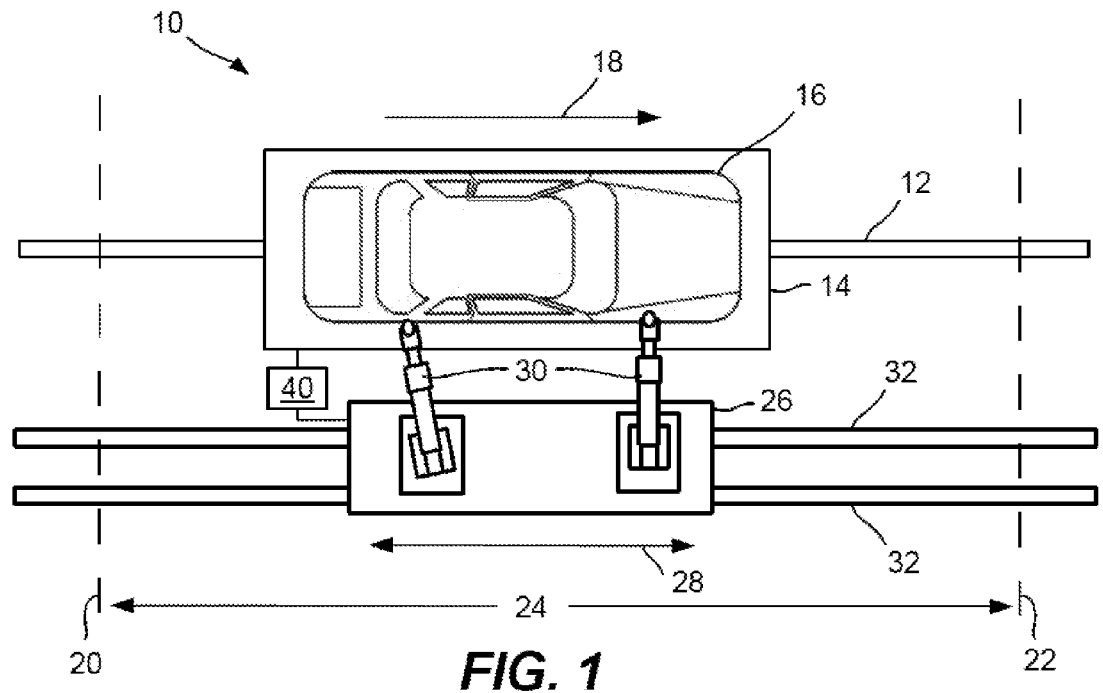
FIG. 1 is a schematic top view of a moving stop station that includes a movable assembly platform synchronized with a vehicle carrier traveling along an assembly line.

Referring to the drawings, wherein like reference numerals are used to identify like or identical components in the various views, FIG. 1 schematically illustrates a moving stop station 10 positioned on an assembly line 12. A vehicle carrier 14 is configured to move/carry a vehicle 16 within the moving stop station 10, in a direction 18 along the line 12, and at a randomly variable speed. The moving stop station 10 may have an entry point 20 and an exit point 22, which together may define the length 24 of the station 10. As the vehicle carrier 14 moves along the line 12, it may enter the station 10 when it crosses the entry point 20, and may exit the station 10 when it crosses the exit point 22.

The moving stop station 10 further includes an assembly platform 26 that is adjacent the assembly line 12 and may be translatable in a direction 28 that is substantially parallel to the line 12. In one embodiment, the assembly platform 26 may support, for example, one or more robotic assembly devices 30 that may perform one or more robotic assembly operations on the vehicle 16. In another embodiment, the assembly platform 26 may support one or more human assembly workers (not shown) in such a manner where the workers may perform one or more assembly operations on the vehicle 16. Assembly operations that may be performed using the robotic assembly device 30 may include precision assembly tasks related to automobile assembly, such as for example, mounting a wheel to a hub and securing it using a plurality of lug nuts, marrying a body with a frame and securing it using a plurality of nuts or welds, and/or installing an instrument panel within the vehicle 16.

The assembly platform 26 may be adapted to ride on one or more tracks 32 that may extend substantially parallel to the assembly line 12. The tracks may include one or more drive mechanisms (not shown), such as, for example, a chain drive, a belt drive, a cable drive or an electro-magnetic drive, that the assembly platform 26 may selectively couple with, and which may cause the platform 26 to translate along the tracks 32. Alternatively, the tracks 32 may have a gear tooth profile that may mesh with a corresponding drive motor disposed on the platform 26, or may be entirely smooth. In an embodiment, the track 32 may be configured to reduce any rolling/translating friction that may oppose the motion of the platform 26, through the use of lubricant, bearings and/or rollers disposed between the track 32 and the platform 26. In still another embodiment, the assembly platform 26 may be maintained on an autonomous vehicle that is configured to translate on the floor in a direction 28 substantially parallel to the assembly line 12.

As further illustrated in FIG. 1, the moving stop station 10 also includes a synchronizer 40 that may be configured to selectively coordinate/synchronize the motion of the assembly platform 26 with the motion of the vehicle carrier 14 while the vehicle carrier 14 is within the moving stop station 10. Such synchronization may result in substantially no relative motion between the vehicle carrier 14 and the assembly platform 26. As such, the synchronizer 40 may detect that the vehicle carrier 14 has entered the moving stop station 10, and may either physically interlock the carrier 14 with the platform 26 such that their motions are synchronized, or may synchronize the two through the use of more advanced control schemes (e.g., open or closed loop control).

As may be appreciated, by precisely synchronizing the movement of the assembly platform 26 with the movement of the vehicle carrier 14, the dynamic control routines/algorithms required to operate the robotic assembly device 30 may be greatly simplified. For example, if the assembly platform 26 were to track the motion of the vehicle carrier 16 with little or no deviation, the robotic assembly device 30 may be controlled as if the vehicle 16 and robotic assembly device 30 were stationary, as occurs with a traditional assembly "stop station."

Figure 2:
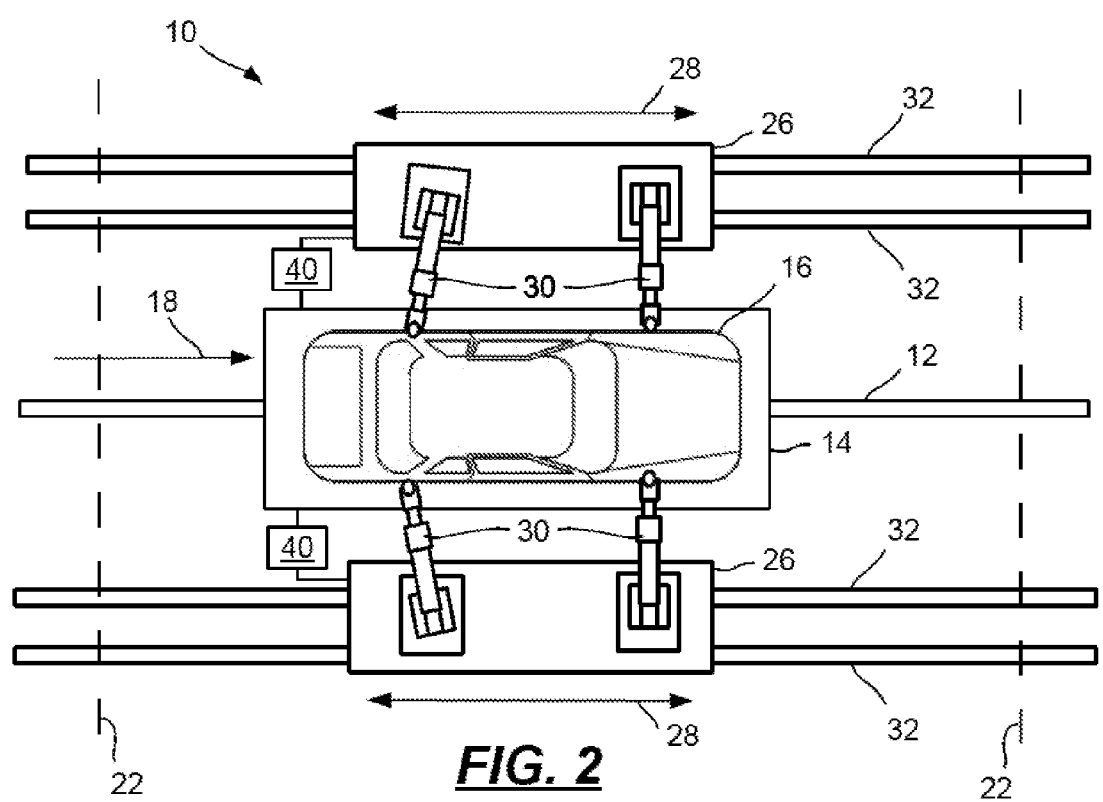
FIG. 2 is a schematic top view of a moving stop station that includes two movable assembly platforms synchronized with a vehicle carrier traveling along an assembly line.

As schematically illustrated in FIGS. 1-2, the synchronizer 40 may be in communication with both the vehicle carrier 14 and the assembly platform 26 to facilitate the motion synchronization. It should be understood that communication may include, for example, mechanical communication, electrical communication, radio frequency (RF) communication, optical communication, or any other forms of communication known in the art. As will be described further below, depending on the chosen configuration, the synchronizer 40 may be physically located on the vehicle carrier 14, on the assembly platform 26, apart from the carrier 14 and platform 26, or on a combination of the carrier 14, platform 26, and/or at a separate location.

Referring to FIG. 2, in an embodiment, the moving stop station 10 may include two assembly platforms 26, where one is disposed on each side of the assembly line 12. In such a configuration, assembly operations may be performed simultaneously from each assembly platform 26 on generally opposing sides of the vehicle 16. In this configuration, each respective assembly platform 26 may be synchronized with the motion of the vehicle carrier 14.

Figure 3:
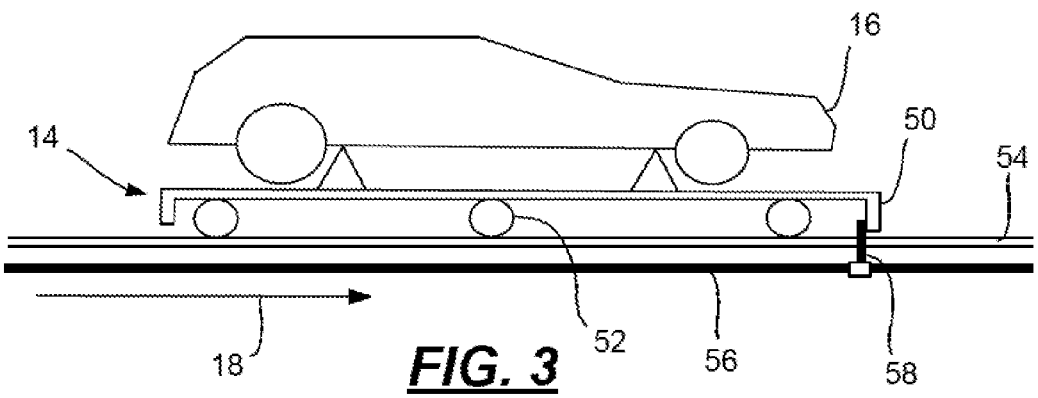
FIG. 3 is a schematic side view of a rolling skid-type vehicle carrier.
Figure 4:
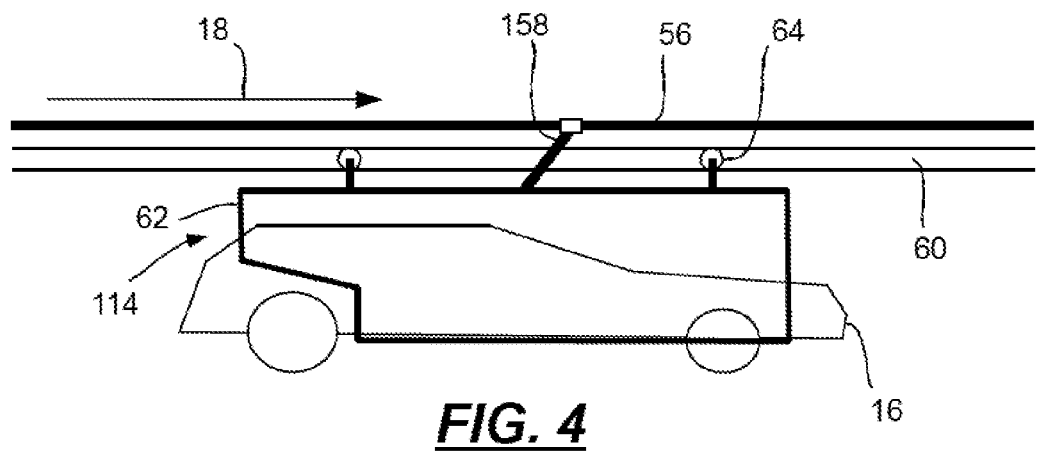
FIG. 4 is a schematic side view of a trolley-type vehicle carrier.
Figure 5:
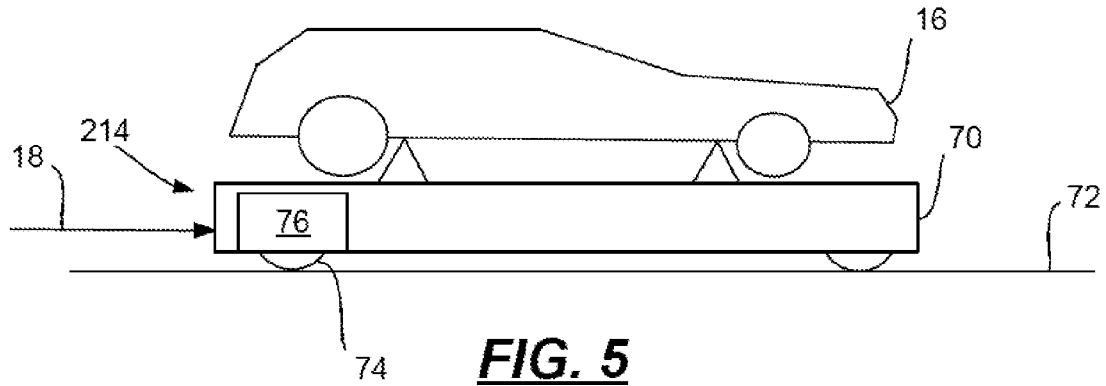
FIG. 5 is a schematic side view of an automated guided vehicle carrier.

FIGS. 3-5 schematically illustrate three general embodiments of a vehicle carrier 14, 114, 214 that may be used to move a vehicle 16. These embodiments are meant to be illustrative of several carrier types, though other carriers may similarly be used.

As shown in FIG. 3, the vehicle carrier 14 may include a rolling skid 50 that may support and restrain the vehicle 16 from any movement relative to the skid 50. The skid 50 may include, for example, a plurality of supporting wheels 52 that may allow the skid 50 to freely translate along the floor or on a track 54. Beneath the floor may lie a moving driveline 56 that may travel in a direction 18 along the assembly line. The driveline 56 may include a moving chain drive, belt drive, cable drive, and/or other similar drive mechanisms.

A mechanical interconnect 58 may extend up from the driveline 56, through the floor/track 54, and engage the rolling skid 50. The mechanical interconnect 58 may, for example, include a push/pull dog or catch that may mate with or engage a corresponding portion of the skid 50 to transfer the motion of the driveline 56 to the rolling skid 50. As may be appreciated, the mechanical interconnect 58 may be selectively engageable with the skid 50 such that it may decouple if commanded or if vertically withdrawn.

FIG. 4 illustrates a carriage or trolley-type vehicle carrier 114 that may suspend the vehicle 16 from an overhead track 60 such as through the use of a carriage 62. As shown, the carriage 62 may support the suspended vehicle body 16, and may restrain it from any movement relative to the carriage 62. The carriage 62 may engage the track 60 using a plurality of rollers 64 or skid pads that are configured to aid the carriage 62 in translating.

A moving driveline 56 may be positioned proximate to the overhead track 60, and may continuously travel in a direction 18 along the assembly line. As with the rolling skid 50, the moving driveline 56 may include a moving chain drive, belt drive, cable drive, and/or other similar drive mechanisms. The carriage 62 may engage the driveline 56 using, for example, a mechanical interconnect 158. Similar to interconnect 58 described above, the mechanical interconnect 158 may include a push/pull dog, a grappling arm, and/or some other form of mechanical catch or interconnect. In an embodiment, the mechanical interconnect 158 may be selectively engageable with the drive line 56 so that, when engaged, the driveline 56 may pull the carriage 62 along the assembly line.

FIG. 5 illustrates an embodiment of a vehicle carrier 214 that includes an automated guided vehicle (AGV) 70 used to move the vehicle 16 in a direction 18 along the assembly line. The AGV 70 may support the vehicle 16 and prevent it from any motion relative to the AGV 70. Similar to the skid 50, the AGV 70 may translate along the floor 72 (or a corresponding track) on a plurality of wheels 74. The wheels 74 may, for example, be intelligently driven using a drive mechanism 76, which may cause the AGV 70 to follow a pre-defined path. Various path-following technologies may be employed to command the drive mechanism 76, such as, for example, visually tracking a line on the floor, electromagnetically tracking an electrical cable embedded in the floor, or other similar path-tracking technologies.

Figure 6:
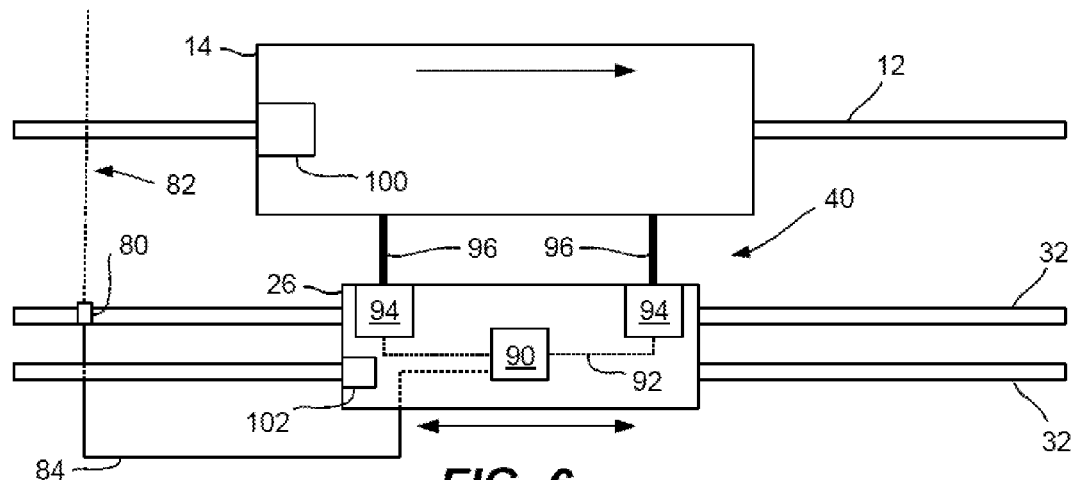
FIG. 6 is a schematic top view of a synchronized assembly platform and vehicle carrier that employs mechanical synchronization means.
Figure 7:
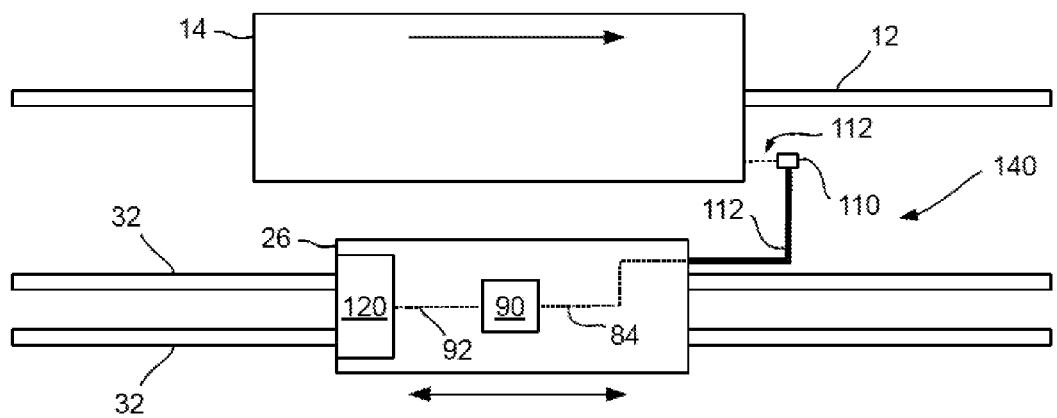
FIG. 7 is a schematic top view of a synchronized assembly platform and vehicle carrier that employs electronic synchronization means including proximity sensing.
Figure 8:
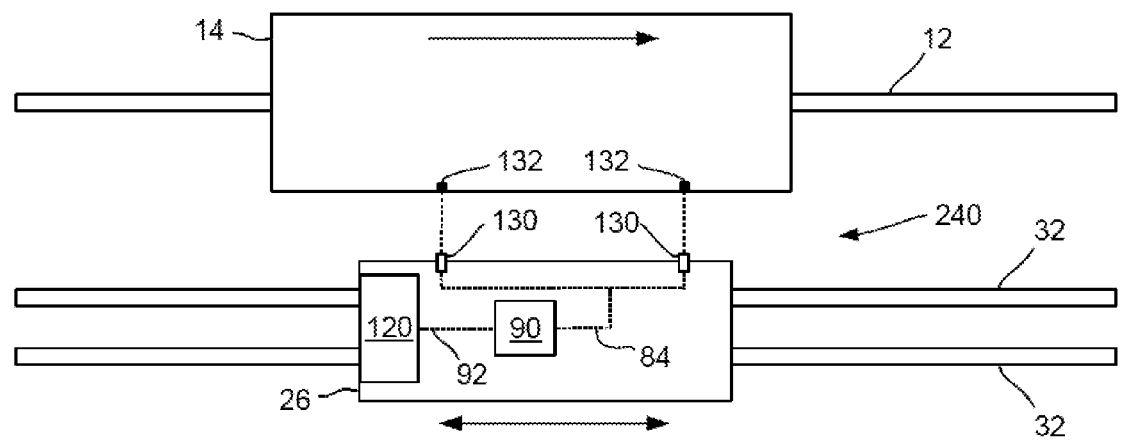
FIG. 8 is a schematic top view of a synchronized assembly platform and vehicle carrier that employs electronic synchronization means including optical target tracking

FIGS. 6-8 schematically illustrate three embodiments of a synchronizer 40, 140, 240 that may be used to synchronize the motion of an assembly platform 26 with the motion of a vehicle carrier 14. In general, the synchronizer 40 may include a sensor, a processor, and an actuator that may work together to effectuate the synchronization. FIG. 6 illustrates an embodiment where the synchronizer 40 employs physical/mechanical synchronization techniques, and FIGS. 7-8 illustrate embodiments where the synchronizer employs electronic tracking techniques.

As illustrated in FIG. 6, the synchronizer 40 may include a sensor, such as a laser sensor 80, which may be configured to sense the position of the vehicle carrier 14 as it travels along the assembly line 12. In an embodiment, the sensor (e.g., laser sensor 80) may indicate when the vehicle carrier 14 crosses a particular point on the line 12, such as when it enters the moving stop station 10. The laser sensor 80 may project a beam of light 82, and may generate a position signal 84, for example, when the beam of light is broken by the carrier 14. As such, the position signal 84 may be indicative of the position of the vehicle carrier 14 along the assembly line 12 at the time when the beam of light 82 is broken. In other embodiments, other visual or electronic sensing means may be similarly employed to generate the position signal 84.

The synchronizer 40 may further include a processor 90 that is configured to receive the position signal 84 from the sensor through wired or wireless communication and may selectively provide a synchronization signal 92 to an actuator. The actuator may then effectuate the synchronization of the motion of the carrier 14 and the platform 26 upon receipt of the synchronization signal 92.

In the embodiment illustrated in FIG. 6, the actuator may include, for example, a motor 94, solenoid, or other similar means of mechanical actuation that may be used to extend a mechanical stabilizer 96. When extended, the mechanical stabilizer 96 may physically interconnect the carrier 14 and the platform 26 such that substantially no relative motion exists between the two. While FIG. 6 illustrates the mechanical stabilizer 96 extending from an actuator 94 disposed on the assembly platform 26, the actuator 94 and mechanical stabilizer 96 may similarly be disposed on the vehicle carrier 14, where the stabilizer 96 is configured to extend to, and interconnect with the assembly platform 26.

Therefore, as illustrated in FIG. 6, once the vehicle carrier 14 is brought into the moving stop station 10 (through, for example, one of the drive means illustrated in FIGS. 3-5), the sensor may sense its position along the line and convey such information to the processor 90. The processor 90 may then direct the actuator 94 to interconnect the carrier 14 and assembly platform 26, such as through the use of a mechanical stabilizer 96, and the two may remain interconnected throughout the duration of the moving stop station 10. Just prior to the vehicle carrier exiting the station, the actuator 94 may retract the mechanical stabilizer 96, effectively decoupling the platform 26 from the carrier 14.

To reduce any imparted stresses on driveline components when the vehicle carrier 14 is physically interconnected with the assembly platform 26, either the carrier 14 or platform 26 may be provided with a clutch 100, 102, which may allow the carrier 14 or platform 26 to selectively disengage the respective drive mechanism. Therefore, once interconnected via the stabilizer 96, either the carrier 14 or platform 26 may actively drive the motion of the joined pair, while the other is passively pulled through the station 10. Once the mechanical stabilizer 96 disengages, the disengaged clutch (either clutch 100 or clutch 102), may re-engage with its respective drive mechanism to provide independent motion control.

FIG. 7 illustrates an embodiment where the synchronizer 140 synchronizes the motion of the vehicle carrier 14 and the motion of the assembly platform 26 without making physical contact between the two. As shown, the synchronizer 40 may include a sensor that is configured to detect the relative positions of the vehicle carrier 14 and the assembly platform 26 through proximity sensing (e.g., a proximity sensor 110). For example, the proximity sensor 110 may be a laser-based sensor that is configured to use a projected laser beam 112 to detect proximity. Alternatively, other proximity sensing means may be used, such as without limitation, hall effect sensing, radar sensing, and/or optical sensing.

In an embodiment, the proximity sensor 110 may be held in front of the vehicle carrier 14 path, such as shown in FIG. 7. In this embodiment, an arm 112 may support the proximity sensor 110, though may be capable of retracting to allow the carrier 14 to pass as it approaches the end 22 of the moving stop station 10. In another embodiment, the proximity sensor 110 may be maintained below or adjacent the path of the carrier 14 such that it will not interfere with the motion of the carrier.

The sensor (e.g., proximity sensor 110) may generate a position signal 84 as the vehicle carrier 14 nears the sensor, where the position signal 84 is indicative of the sensed position of the vehicle carrier 14 along the assembly line 12 relative to the position of the assembly platform 26. The processor 90 may receive the position signal 84, and may selectively provide a synchronization signal 92 to an actuator (e.g., a drive mechanism 120). The drive mechanism 120 may then controllably move the assembly platform 26 along the assembly line 12 on the guide rails 32 to synchronize the motion of the platform 26 with the motion of the vehicle carrier 14. In other embodiments, the drive mechanism 120 may include one or more direct drive motors, servo motors, gear drives, belt drives, chain drives, or other similar means of translating the assembly platform 26.

FIG. 8 schematically illustrates an embodiment of the synchronizer 240 that is similar in function to the synchronizer 140 provided in FIG. 7, however, the synchronizer 240 in FIG. 8 employs the use of optical target tracking instead of proximity sensing. As illustrated, the sensor includes one or more optical cameras 130 that can scan for, and identify the position of one or more optical targets 132. The target tracking cameras 130 may generate a corresponding position signal 84 that may be interpreted by the processor 90 as the relative position between the vehicle carrier 14 and assembly platform 26 along the assembly line 12.

In still other embodiments, the sensor may include a linear encoder, linear potentiometer, position transducer, or other position tracking device that may be used to sense and/or monitor the position of the vehicle carrier 14 as it travels down the assembly line 12. It should be appreciated that the sensor may be in either direct electrical contact with the processor 90, or may be wirelessly coupled to the processor 90 using any acceptable wireless data transmission means.

The processor 90 may be embodied, as a server or a host machine, i.e., one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics. In an embodiment, the processor 90 may include such power electronic components that may be necessary to generate a synchronization signal 92 capable of, for example, powering a drive mechanism 120, such as a servomotor.

While shown as a single device in FIGS. 6-8 for simplicity and clarity, the various elements the processor 90 may be distributed over as many different hardware and software components as are required to optimally control the actuator using inputs from the sensor. The individual control routines/systems resident in the processor 90 or readily accessible thereby may be stored in ROM or other suitable tangible memory location and/or memory device, and automatically executed by associated hardware components of the processor 90 to provide the respective control functionality.

In the electronic control/tracking embodiments provided in FIGS. 7 and 8, the assembly platform 26 may be initially positioned near the entry point 20 of the moving stop station 10. Once the processor 90 detects that the vehicle carrier 14 is approximately aligned with the assembly platform 26, the processor 90 may direct the drive mechanism 120 to begin translating the assembly platform 26 along the assembly line 12 in a manner that matches the motion of the carrier 14. The processor 90 may control the drive mechanism 120 to maintain a substantially constant relative position and motion between the carrier 14 and platform 26, such as sensed by the sensor. The control technique may employ the use of closed-loop control principles, such as for example, proportional, integral, and/or derivative control. In an embodiment, the processor 90 may control the motion of the assembly platform 26 for a portion of or for the entire length 24 of the moving stop station 10.

The proximity sensing and optical target tracking embodiments provided in FIGS. 7 and 8 may have broad applicability and be relatively inexpensive to implement since they do not require significant re-tooling or significant retrofits to pre-existing vehicle carriers 14. For example, with optical target tracking, the optical targets 132 may be adhesive-backed stickers that may be placed in a controlled location on the carrier 14. In this regard, previously built vehicle carriers 14 used in stationary stop station assembly lines may be easily adapted to a moving stop station assembly line configuration.

Figure 9:
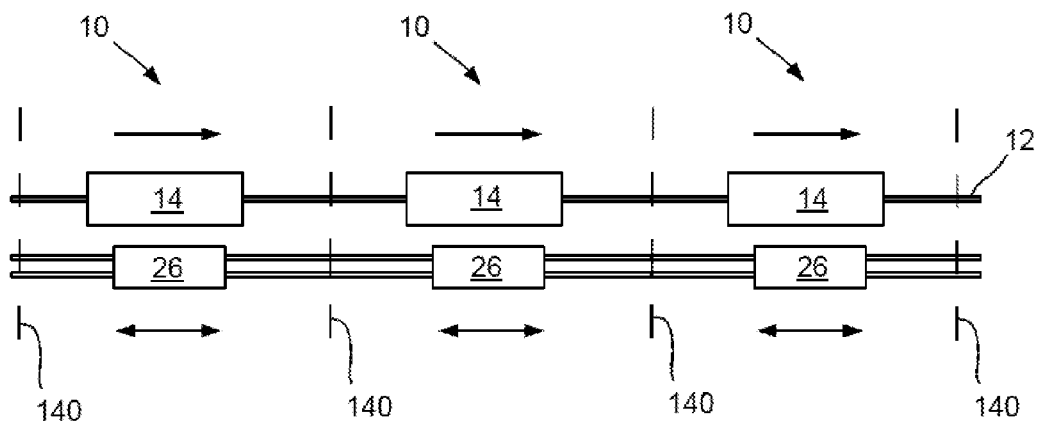
FIG. 9 is a schematic top view of a plurality of moving stop stations disposed along an assembly line.

FIG. 9 illustrates a plurality of moving stop stations 10 arranged along an assembly line 12. In such a configuration, the vehicle carriers 14 may constantly move along the assembly line 12 in a generally uniform manner. Each assembly platform 26 may each be configured to shuttle within its respective station 10 and between the respective entry/exit points 140. At each station 10, an assembly operation may be performed on a vehicle 16, supported by the carrier 14. Once the assembly operation is complete, the assembly platform 26 may translate back to the entry point of the station 10 and wait for the next vehicle carrier 14 to enter.

In an embodiment, the synchronizer (e.g., synchronizers 140, 240) may be configured to synchronize the motion of the assembly platform 26 with the motion of the vehicle carrier 14 intermittently throughout the length 24 of the moving stop station 10. For example, in a tire-securing station, an assembly robot 30 supported by the assembly platform 26 may secure a first tire to the vehicle while being synchronized with the vehicle carrier 14. The platform 26 may then return to a "home" position for the robot 30 to pick up a second tire, after which the platform 26 may resume synchronization with the carrier 14, and the second tire may be secured. This motion is generally illustrated in the graphs provided in FIG. 10.

Figure 10:
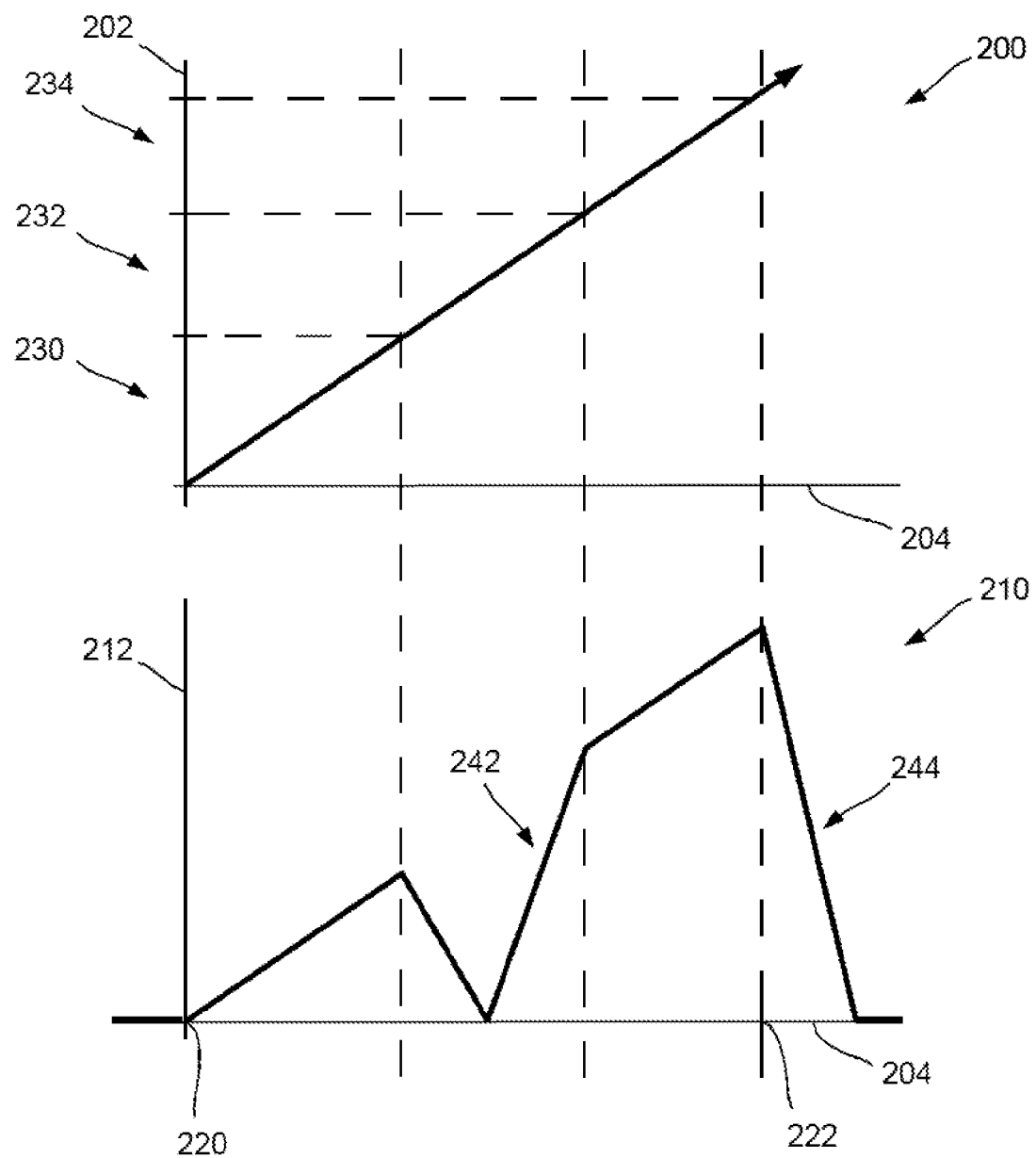
FIG. 10 includes two representative graphs that illustrate the motion of a vehicle carrier and assembly platform throughout a moving stop station.

The first graph 200 of FIG. 10 generally illustrates the motion of the vehicle carrier 14 throughout a moving stop station 10. The carrier's position 202 within the station 10 is represented by the vertical axis, and time 204 is represented by the horizontal axis. The second graph 210 of FIG. 10 then illustrates the motion of the assembly platform 26 throughout the tire securing routine described above. As such, the platform's position 212 within the moving stop station is represented by the vertical axis, and time 204 is represented by the horizontal axis.

As illustrated in the graphs 200, 210, the vehicle carrier may enter the moving stop station 10 at an initial time 220 (i.e., time "zero") and the assembly operation may be completed at a concluding time 222. The vehicle carrier may pass through three distinct portions or lengths 230, 232, 234 of the station 10. In the first length, the motion of the assembly platform 26 may be synchronized with the motion of the vehicle carrier 14. During this time, the first tire may be secured to the vehicle. Once the first tire is secured, the assembly platform 26 may return back to a "home" position to retrieve a second tire. While the platform is retrieving the second tire, the vehicle carrier continues to travel along the station (i.e, a second length 232). Once the tire is retrieved, the assembly platform 26 may quickly accelerate back to the expected position of the carrier 14 (the acceleration shown generally at 242) where it can then "lock" or re-synchronize with the motion of the carrier 14. Once re-synchronized, the second tire may be secured to the vehicle while the carrier 14 continues to traverse through the third length 234. After both tires are secured, the assembly platform 26 may quickly return back to the "home" or initial position to wait for the next vehicle carrier (return motion shown generally at 244). It should be noted that the tire-assembly operation is meant to be purely illustrative, and should not limit the present invention in any way. It is further contemplated that within the moving stop station 10, there may be more than two synchronized sections.

While the best modes for carrying out the invention have been described in detail, those familiar with the art to which this invention relates will recognize various alternative designs and embodiments for practicing the invention within the scope of the appended claims. All directional references (e.g., upper, lower, upward, downward, left, right, leftward, rightward, above, below, vertical, and horizontal) are only used for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not as limiting.

The invention claimed is:

1. A moving stop station comprising:
   a vehicle carrier configured to move a vehicle along an assembly line in a substantially constant direction;
   an assembly platform disposed adjacent to the assembly line, the assembly platform being movably translatable in a direction substantially parallel to the assembly line; and
   a synchronizer in communication with the vehicle carrier and with the assembly platform, the synchronizer configured to synchronize the motion of the assembly platform with the motion of the vehicle carrier as the vehicle carrier moves along a length of the assembly line, the synchronizer including:
   a sensor configured to sense the position of the vehicle carrier and to generate a position signal corresponding to the sensed position;
   a processor configured to receive the position signal and to selectively provide a synchronization signal in response to the position signal; and an actuator configured to receive the synchronization signal and to synchronize the movement of the vehicle carrier with the movement of the assembly platform in response thereto, wherein the synchronization results in substantially no relative motion between the vehicle carrier and the assembly platform.

2. The moving stop station of claim 1, wherein the synchronizer further includes a mechanical stabilizer coupled with the actuator; and wherein the actuator is configured to extend the mechanical stabilizer between the vehicle carrier and the assembly platform in response to the synchronization signal.

3. The moving stop station of claim 2, wherein the assembly platform includes a drive mechanism and a clutch configured to selectively disengage the drive mechanism; the drive mechanism configured to translate the assembly platform along the assembly line;

wherein the actuator is disposed on the vehicle carrier; and wherein the clutch is configured to disengage the drive mechanism in response to the extension of the mechanical stabilizer from the vehicle carrier to the assembly platform.

4. The moving stop station of claim 2, wherein the assembly line includes a moving drive line, the vehicle carrier being selectively engagable with the drive line;

wherein the actuator is disposed on the assembly platform; and wherein the vehicle carrier is configured to disengage from the drive line in response to the extension of the mechanical stabilizer from the assembly platform to the vehicle carrier.

5. The moving stop station of claim 2, wherein the vehicle carrier is configured to enter the moving stop station at an entry point, and configured to exit the moving stop station at an exit point, the entry point and exit point being positions disposed along the length of the assembly line; and wherein the actuator is configured to retract the mechanical stabilizer prior to the carrier crossing the exit point.

6. The moving stop station of claim 5, wherein the position signal is indicative of the vehicle carrier crossing the entry point.

7. The moving stop station of claim 1, wherein the actuator includes a drive mechanism coupled to the assembly platform, the drive mechanism configured to translate the assembly platform along the assembly line.

8. The moving stop station of claim 7, wherein the sensor is a proximity sensor; and wherein the position signal is indicative of the position of the vehicle carrier along the assembly line relative to the position of the assembly platform along the assembly line.

9. The moving stop station of claim 7, wherein the sensor includes a target tracking camera and a target; and wherein the position signal is indicative of the position of the vehicle carrier along the assembly line relative to the position of the assembly platform along the assembly line.

10. The moving stop station of claim 7, wherein the sensor includes an encoder.

11. The moving stop station of claim 7, further comprising a first length, a second length, and a third length respectively ordered along the assembly line; and wherein the synchronizer is configured to synchronize the motion of the assembly platform with the motion of the vehicle carrier as the vehicle carrier passes through the first length and the third length; and wherein the motion of the assembly platform is not synchronized with the motion of the vehicle carrier as the vehicle carrier passes through the second length.

12. The moving stop station of claim 1, wherein the assembly platform includes a precision robotic assembly device.

13. A moving stop station comprising:

a vehicle carrier configured to move a vehicle along an assembly line in a substantially constant direction;

an assembly platform disposed adjacent to the assembly line, the assembly platform being movably translatable in a direction substantially parallel to the assembly line; and a synchronizer in communication with the vehicle carrier and with the assembly platform, the synchronizer configured to synchronize the motion of the assembly platform with the motion of the vehicle carrier as the vehicle carrier moves along a length of the assembly line, the synchronizer including:

a sensor configured to sense the position of the vehicle carrier and to generate a position signal corresponding to the sensed position;

a processor configured to receive the position signal and to selectively provide a synchronization signal in response to the position signal; and an actuator including a drive mechanism coupled to the assembly platform and configured to translate the assembly platform along the assembly line, the drive mechanism configured to receive the synchronization signal and to synchronize the motion of the vehicle carrier and the motion of the assembly platform in response thereto, wherein the synchronization results in substantially no relative motion between the vehicle carrier and the assembly platform.

14. The moving stop station of claim 13, wherein the sensor is a proximity sensor; and wherein the position signal is indicative of the position of the vehicle carrier along the assembly line relative to the position of the assembly platform along the assembly line.

15. The moving stop station of claim 13, wherein the sensor includes a target tracking camera and a target; and wherein the position signal is indicative of the position of the vehicle carrier along the assembly line relative to the position of the assembly platform along the assembly line.

16. The moving stop station of claim 13, further comprising a first length, a second length, and a third length respectively ordered along the assembly line; and wherein the synchronizer is configured to synchronize the motion of the assembly platform with the motion of the vehicle carrier as the vehicle carrier passes through the first length and the third length; and wherein the motion of the assembly platform is not synchronized with the motion of the vehicle carrier as the vehicle carrier passes through the second length.

17. The moving stop station of claim 13, wherein the vehicle carrier is an automated guided vehicle.

18. The moving stop station of claim 13, wherein the vehicle carrier is configured to enter the moving stop station at an entry point, and configured to exit the moving stop station at an exit point, the entry point and exit point being positions disposed along the length of the assembly line; and wherein the drive mechanism is configured to translate the assembly platform to a location proximate the entry point when the vehicle carrier exits the moving stop station.

* * * * *